United States Patent [19]

Polster

[11] 4,238,995
[45] Dec. 16, 1980

[54] TOASTER CONTROL

[76] Inventor: Louis S. Polster, 1017 Fairmount Rd., Burbank, Calif. 91501

[21] Appl. No.: 910,195

[22] Filed: May 30, 1978

[51] Int. Cl.³ .............................................. A47J 27/62
[52] U.S. Cl. ........................................ 99/331; 99/337; 99/341; 99/393; 99/399; 219/411
[58] Field of Search ................................. 99/331–333, 99/385, 468, 337, 341, 391, 392, 393, 399; 219/411, 412, 413, 441, 494

[56] References Cited

U.S. PATENT DOCUMENTS

| 2,532,569 | 12/1950 | Poole | 99/333 |
| 2,631,524 | 3/1953 | Theisen | 99/333 |
| 2,750,873 | 6/1956 | Sivacek | 99/329 R |
| 2,908,213 | 10/1959 | Locke | 99/333 |
| 3,193,663 | 7/1965 | Budzich | 99/391 X |
| 3,349,692 | 10/1967 | Jones | 99/331 |
| 3,416,430 | 12/1968 | Hauser | 99/337 X |
| 3,836,751 | 9/1974 | Anderson | 219/411 |
| 3,859,903 | 1/1975 | Kipp | 99/391 |
| 4,170,932 | 10/1979 | Lalancette | 99/331 |

Primary Examiner—Billy J. Wilhite
Attorney, Agent, or Firm—Allan M. Shapiro

[57] ABSTRACT

High intensity radiant energy is supplied to the surface of food items by a quartz iodide lamp. A temperature probe which senses both the ambient temperature in the toaster housing and the lamp radiance controls the on-time of the lamp to produce the desired surface temperature to accomplish the desired cooking.

5 Claims, 2 Drawing Figures

TOASTER CONTROL

BACKGROUND OF THE INVENTION

1. Field of the Invention

This invention is directed to a toaster for toasting food items and particularly to a toaster-oven having high intensity radiant lamps as the heating source and having a controller to control the on-time of those lamps for proper cooking.

2. Description of the Prior Art

While the radiance of high intensity lamps is well-known, they have not been satisfactory for the cooking of toast and similar food items because the control systems previously used therewith have been inadequate to sense the conditions at which the lamps have completed cooking and should be shut off.

Prior toasters have employed wound nichrome wire heating elements to provide the radiance for the cooking of toast. Nichrome is a satisfactory heating element for such purposes and has the advantage of having a rising resistance with a rising temperature. This makes the nichrome heating element self-limiting in well-designed installations so that temperatures which are excessive with respect to the heating element and which are excessive with respect to the food item being cooked are prevented by the inherent properties of the heater. Thus, the type of toaster control employed with nichrome heating elements does not satisfactorily control the higher intensity sources such as quartz iodide lamps and similar sources.

SUMMARY OF THE INVENTION

In order to aid in the understanding of this invention, it can be stated in essentially summary form that it is directed to a toaster-type oven having a high intensity radiant heat source and having a controller which senses both the temperature of the ambient air in the toaster housing and the radiance of the energy source to turn off the energy source when cooking is complete.

It is thus an object of this invention to provide a toaster-type of oven with a high intensity radiant energy cooking source and with a controller therefor so that a food item can be radiantly cooked to completion, and at completion, the radiant heat source is turned off by the controller. It is another object to sense both the radiance and the internal ambient temperature of the toaster oven so that both values are considered in determining when the cooking is complete for turning off of the radiant source. It is a further object to provide a toaster oven which employs high intensity radiant cooking energy as from a quartz iodide lamp and can be controlled to cook toast, melt cheese on soup or bread, cook glaze on chicken, heat an upper food layer, and melt the cheese on a precooked pizza and the like with turn-off of the toaster oven upon completion of cooking.

The features of the present invention which are believed to be novel are set forth with particularity in the appended claims. The present invention, both as to its organization and manner of operation, together with further objects and advantages thereof, may be understood best by reference to the following description taken in conjunction with the accompanying drawings.

DESCRIPTION OF THE PREFERRED EMBODIMENT

Figure 1:
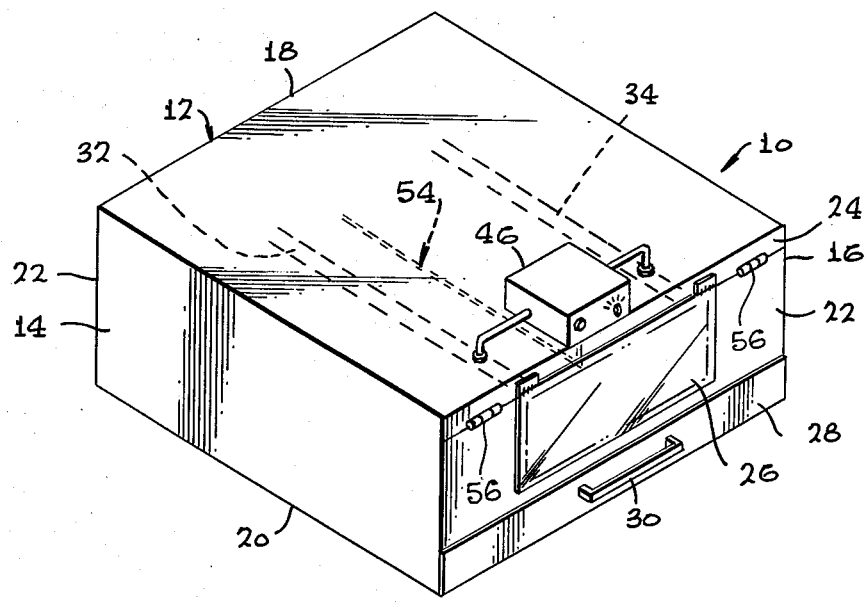
FIG. 1 is an isometric view of a toaster oven having the control in accordance with this invention.
Figure 2:
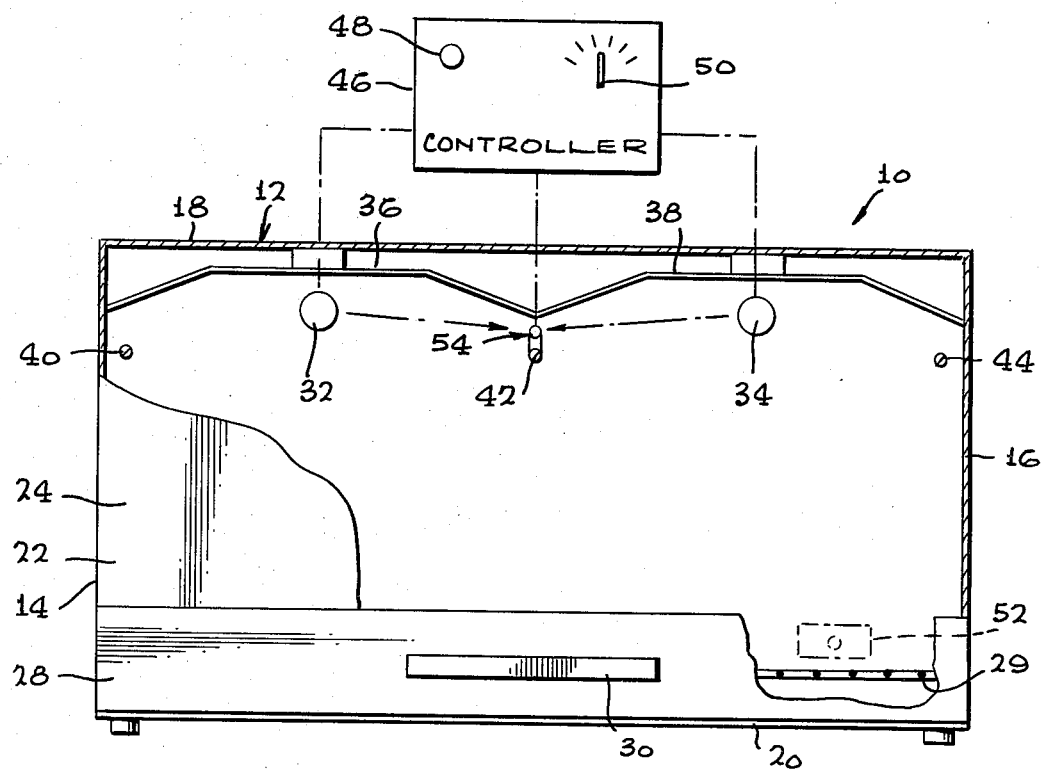
FIG. 2 is an enlarged front-elevational view of the toaster oven, with parts broken away and parts taken in section to show a portion of the internal structure, with the controller shown schematically.

FIG. 1 shows the toaster with its control at 10, and FIG. 2 shows an enlarged front-elevational view thereof, with parts broken away. Housing 12 has the usual sides 14 and 16, top 18, bottom 20, back and front 22. These parts enclose an oven space in which the cooking is done. The front 22 has a portion 24 which has window 26 therein by which cooking can be observed. Drawer 28 is slidably mounted on the housing 12 adjacent the bottom 20 to withdraw from the interior of the cooking space to receive food items to be cooked and to withdraw the cooked food items after cooking is completed. Drawer 28 has a bottom surface or a bottom grill 29 on which the food item is placed. The drawer height is sufficient that the top of the food item is able to be inserted into the drawer space without engagement on the lower edge of the fixed front portion 24. Front portion 24 can be hinged at 56 at the top of its window to admit larger food items for special purposes. Handle 30 is manually engageable to permit opening and closing of the drawer to place food items in the oven and retrieve them therefrom.

High intensity radiation for cooking is provided by lamps 32 and 34 which are mounted interiorly of the housing 12 of the oven toward the top thereof and directed downward. Reflectors 36 and 38 direct the radiant energy generally downwardly toward drawer 28 and the food item therein. Lamps 32 and 34 are preferably quartz iodide lamps which provide high intensity radiation with a power of about 1,800 watts per bulb in a size suitable for the toaster oven of this invention. Guard bars 40, 42 and 44 extend through the toaster oven housing 12 from front to back below the lamps to protect the lamps against inadvertent contact due to puffing or warping of a food item, tilting of the drawer 28, or incorrect admission of larger food items.

Lamps 32 and 34 cause the cooking by radiance and by heating the air in the oven housing. The lamps are controlled by controller 46 which has several inputs. Manual pushbutton 48 signals the commencement of a cooking cycle, although drawer operated switch 52 behind the drawer could signal that commencement when the drawer is closed. Selector 50 preselects the amount of cooking energy, for different amounts of cooking energy are required for different food items. For example, English muffins require more cooking energy than ordinary toast. Similarly, cheese on a bowl of soup or heating a precooked pizza require different amounts of cooking energy. This cooking energy is preselected by selector 50. For any one food item, such as toast, selector 50 remains at one point.

Drawer switch 52 shuts off the lamps when the drawer is open, even in the middle of a cooking cycle to prevent the waste of energy in the absence of a food item and to prevent unnecessary overheating of the oven interior. As stated above, drawer switch 52 could be employed as a cycle-start signal, if desired.

The most important input signal to the controller is provided by sensor 54. Sensor 54 is an elongated, thin probe having sensitivity along the entire portion of its length within the radiant zone. A temperature-resistance transducer is the active element of the probe and comprises an electric conductor of suitable size, length and material so that it provides a changing resistance signal with changing temperature. The probe is substantially the same length as the lamps so that, being thus coextensive, it receives radiant energy from substantially the entire length of the lamps for maximum sensitivity and accuracy. The resistance wire is imbedded in an insulator of high temperature capability, and the insulated sensing wire is housed in the elongated sheath tube indicated as sensor 54. Sensor 54 is mounted on the top of guard bar 42 so that it is protected against mechanical damage. However, in this position, sensor 54 is in direct line, as indicated by the arrows, to receive radiance from both lamps 32 and 34. Furthermore, sensor 54 is within the interior of the toaster oven housing 12 so that it senses ambient temperature. Thus, sensor 54 is subject to the two most important energies accomplishing the cooking—the ambient air temperature and the radiance. This signal goes to controller 46, which acts as a time and temperature integrator having its own empirically determined cooking rate curves so that cooking is successfully accomplished.

In use, the interior of housing 12 gets hotter with each cycle when the cycles occur fairly frequently. During the first cycle from cold, the interior sensed temperature may rise from room ambient up to about 800 degrees with an average of about 500 degrees F. Under these circumstances, the cooking time for toast may be about 1 minute.

When controller 46 indicates the completion of cooking, the lamps 32 and 34 are turned off, and a signal such as an audible or visual signal is emitted to show the user it is time to retrieve the cooked food item. If a second cycle is immediately performed, that is, a fresh piece of bread to be toasted is placed in drawer 28, then, due to the stored heat within housing 12, the time need not be as long. On a second cycle, the average temperature sensed by sensor 54 may be expected to be about 600 or 700 degrees F., and the controller 46 would indicate completion of cooking of toast in about 30 to 40 seconds. Thus, the sensed ambient and radiant heat are integrated with time to shut off the cycle accurately when the cooking is done.

This invention having been described in its preferred embodiment, it is clear that it is susceptible to numerous modifications and embodiments with the ability of those skilled in the art and without the exercise of the inventive faculty. Accordingly, the scope of this invention is defined by the scope of the following claims.

What is claimed is:

1. A toaster for the cooking of a food item, said toaster comprising:
    a housing;
    a support surface for supporting a food item to be cooked within said housing;
    an elongated quartz-iodide lamp in said housing spaced from and parallel to said support surface; and
    an elongated temperature-resistance transducer in the form of a probe positioned within said housing, said transducer being coextensive with and parallel to said lamp for sensing the heat energy from both the ambient temperature within said housing and the radiance of said lamp for producing a signal corresponding to said heat energy; and
    control means operatively connected to said lamp and to said transducer for turning off said lamp at a predetermined time when the heat energy of both the ambient temperature within said housing and also the radiance of said lamp have been sufficient to cook a food item supported on said support surface.

2. The toaster of claim 1 wherein there are two quartz-iodide lamps and said support surface includes a drawer adjacent the bottom of said housing, said drawer being at least partially withdrawable from said housing to receive a food item to be cooked and being repositionable within said housing to place a food item thereon within the radiance of said quartz-iodide lamps.

3. The toaster of claim 2 wherein a reflector is positioned above each of said lamps to direct the radiant energy from said lamps in a generally downward direction and at least one guard bar is positioned below the level of said lamps within said housing.

4. The toaster of claim 3 wherein said sensing probe is mounted above said guard bar to protect said probe against physical contact and is mounted on said guard bar.

5. The toaster of claim 4 wherein a drawer-operated switch is connected to said controller so that, when said drawer is partially withdrawn from said housing, said lamps are turned off.

* * * * *